(12) United States Patent
Oh et al.

(10) Patent No.: US 8,527,282 B2
(45) Date of Patent: Sep. 3, 2013

(54) METHOD AND AN APPARATUS FOR PROCESSING A SIGNAL

(75) Inventors: Hyen-O Oh, Seoul (KR); Yang Won Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 529 days.

(21) Appl. No.: 12/743,327

(22) PCT Filed: Nov. 21, 2008

(86) PCT No.: PCT/KR2008/006884
§ 371 (c)(1),
(2), (4) Date: May 17, 2010

(87) PCT Pub. No.: WO2009/066960
PCT Pub. Date: May 28, 2009

(65) Prior Publication Data
US 2010/0274557 A1    Oct. 28, 2010

Related U.S. Application Data

(60) Provisional application No. 60/989,450, filed on Nov. 21, 2007, provisional application No. 60/989,452, filed on Nov. 21, 2007.

(51) Int. Cl.
*G10L 19/00* (2013.01)
(52) U.S. Cl.
USPC ........... 704/500; 704/501; 704/502; 704/503; 704/504
(58) Field of Classification Search
USPC .................................. 704/500–504
See application file for complete search history.

(56) References Cited

U.S. PATENT DOCUMENTS 6,131,084 A   10/2000   Hardwick
7,039,044 B1   5/2006   Whitfield et al.
(Continued)

FOREIGN PATENT DOCUMENTS

CN   1527995 A   9/2004
CN   1774957 A   5/2006
(Continued)

OTHER PUBLICATIONS

Dietz et al., "Spectral Band Replication, a novel approach in audio coding," Audio Engineering Society, Convention Paper 5553, XP009020921, pp. 1-8, May 10, 2002.
(Continued)

*Primary Examiner* — Michael N Opsasnick
(74) *Attorney, Agent, or Firm* — Birch, Stewart, Kolasch & Birch, LLP

(57) ABSTRACT

A method of processing a signal is disclosed. The present invention includes receiving extension information and at least one downmix signal of a first downmix signal decoded by a audio coding scheme and a second downmix signal decoded by a speech coding scheme; determining an extension base signal corresponding to a partial region of the downmix signal based on the extension information; and generating an extended downmix signal having a bandwidth extended by reconstructing a high frequency region signal using the extension base signal and the extension information. According to a signal processing method and apparatus of the present invention, signal corresponding to a partial frequency region of the downmix signal is used as the extension base signal. Therefore, the high frequency region of the downmix signal is reconstructed by using the extension base signal having variable bandwidth.

11 Claims, 15 Drawing Sheets

(56) References Cited

U.S. PATENT DOCUMENTS

| | | |
|---|---|---|
| 7,573,912 B2 | 8/2009 | Lindblom |
| 7,668,722 B2 | 2/2010 | Villemoes et al. |
| 7,720,230 B2 | 5/2010 | Allamanche et al. |
| 7,930,184 B2 | 4/2011 | Fejzo |
| 8,078,474 B2 | 12/2011 | Vos et al. |
| 8,135,047 B2 | 3/2012 | Rajendran et al. |
| 8,140,324 B2 | 3/2012 | Vos et al. |
| 8,145,499 B2 | 3/2012 | Herre et al. |
| 8,260,609 B2 | 9/2012 | Rajendran et al. |
| 2002/0040295 A1 | 4/2002 | Saunders et al. |
| 2003/0093271 A1 | 5/2003 | Tsushima et al. |
| 2005/0137864 A1* | 6/2005 | Valve et al. .................. 704/227 |
| 2005/0192798 A1* | 9/2005 | Vainio et al. ................ 704/223 |
| 2005/0251387 A1* | 11/2005 | Jelinek et al. ............... 704/223 |
| 2005/0261892 A1* | 11/2005 | Makinen et al. .......... 704/200.1 |
| 2005/0267742 A1* | 12/2005 | Makinen ...................... 704/219 |
| 2005/0267763 A1 | 12/2005 | Ojanpera |
| 2006/0106619 A1* | 5/2006 | Iser et al. .................... 704/500 |
| 2006/0140412 A1 | 6/2006 | Villemoes et al. |
| 2006/0173675 A1* | 8/2006 | Ojanpera ..................... 704/203 |
| 2007/0016412 A1 | 1/2007 | Mehrotra et al. |
| 2007/0081597 A1 | 4/2007 | Disch et al. |
| 2007/0127729 A1 | 6/2007 | Breebaart et al. |
| 2007/0291951 A1 | 12/2007 | Faller |
| 2008/0027717 A1* | 1/2008 | Rajendran et al. .......... 704/210 |
| 2010/0211400 A1* | 8/2010 | Oh et al. ..................... 704/500 |
| 2010/0274557 A1* | 10/2010 | Oh et al. ..................... 704/219 |
| 2010/0305956 A1* | 12/2010 | Oh et al. ..................... 704/500 |
| 2011/0196686 A1 | 8/2011 | Oshikiri |

FOREIGN PATENT DOCUMENTS

| | | |
|---|---|---|
| EP | 1024679 A2 | 8/2000 |
| EP | 1691348 A1 | 8/2006 |
| EP | 1668959 B1 | 1/2007 |
| EP | 1853093 A1 | 11/2007 |
| JP | 2000-267699 A | 9/2000 |
| JP | 2001-521648 A | 11/2001 |
| JP | 2003-216190 A | 7/2003 |
| JP | 2004-198485 A | 7/2004 |
| JP | 2006-518482 A | 8/2006 |
| KR | 10-2007-0081735 A | 8/2007 |
| RU | 2 214 048 C2 | 10/2000 |
| RU | 2002126217 A | 4/2004 |
| RU | 2005 104 123 A | 7/2005 |
| WO | WO 98/57436 A2 | 12/1998 |
| WO | WO 2004/008806 A1 | 1/2004 |
| WO | WO 2004/093494 A1 | 10/2004 |
| WO | WO 2005/040749 A1 | 5/2005 |
| WO | WO 2005/101372 A1 | 10/2005 |
| WO | WO 2006/126844 A1 | 11/2006 |
| WO | WO 2007/004828 A2 | 1/2007 |
| WO | WO 2007/083931 A1 | 7/2007 |

OTHER PUBLICATIONS

ETSI Standards, "Digital cellular telecommunications system (Phase 2+); Universal Mobile Telecommunications System (UMTS); etc.," 3GPP TS 26.290 Version 6.3.0, Release 6, ETSI TS 126 290 V6.3.0, XP014030612, Jun. 1, 2005.

Schuijers et al., "Low complexity parametric stereo coding," Audio Engineering Society, Convention Paper 6073, XP008047510, pp. 1-11, May 8, 2004.

Laroche et al., "New Phase-Vocoder Techniques for Real-Time Pitch Shifting, Chorusing, Harmonizing, and Other Exotic Audio Modifications", J. Audio Eng. Soc., vol. 47, No. 11, Nov. 1, 1999, pp. 928-936, XP-000948562.

Moulines et al., "Non-parametric techniques for pitch-scale and time-scale modification of speech", Speech Communication, Elsevier Science Publishers, Amsterdam, NL, vol. 16, No. 2, Feb. 1, 1995, pp. 175-205, XP 4024959.

3GPP TS 26.290 V6.3.0, "3rd Generation Partnership Project; Technical Specification Group Service and System Aspects; Audio codec processing functions; Extended Adaptive Multi-Rate—Wideband (AMR-WB+) codec; Transcoding functions (Release 6)", pp. 1-85, Jun. 2005.

Breebaart et al.,"Spatial psychoacoustics as the basis for innovations in the field of audio coding and processing," 19th International Congress on Acoustics, Madrid, Sep. 2-7, 2007, See pp. 5 'Spatial audio object coding'.

* cited by examiner (a)

(b)

US 8,527,282 B2

METHOD AND AN APPARATUS FOR PROCESSING A SIGNAL

This application is the National Phase of PCT/KR2008/006884 filed on Nov. 21, 2008, which claims priority under 35 U.S.C. 119(e) to U.S. Provisional Application No. 60/989,450 filed on Nov. 21, 2007 and U.S. Provisional Application No. 60/989,452 filed on Nov. 21, 2007, all of which are hereby expressly incorporated by reference into the present application.

FIELD OF THE INVENTION

The present invention is particularly suitable for encoding or decoding a signal by a scheme suitable according to a characteristic of the signal.

BACKGROUND ART

Generally, a speech encoder is able to encode a speech signal at a low bitrate below 12 kps, whereas an audio encoder is capable of providing an audio signal of high quality at a high bitrate over 48 kbp.

However, a conventional audio encoder is inefficient in processing a speech signal. And, a conventional speech encoder is not suitable for processing an audio signal.

SUMMARY OF THE INVENTION

Accordingly, the present invention is directed to an apparatus for processing a signal and method thereof that substantially obviate one or more of the problems due to limitations and disadvantages of the related art.

An object of the present invention is to provide an apparatus for processing a signal and method thereof, by which the signal can be efficiently processed according to characteristics of a sound source using mode information determining a coding scheme and modification reconstruction information adjusting an interval on a time domain of a first signal.

Another object of the present invention is to provide an apparatus for processing a signal and method thereof, by which the signal can be efficiently processed according to characteristics of a sound source in a manner that an extension base signal used for reconstruction of a high-frequency region removed by an encoder side is variously determined to use a bandwidth extending technology.

Accordingly, the present invention provides the following effects or advantages.

First of all, in an apparatus for processing a signal and method thereof, before a first signal is encoded by a first coding scheme, a size of a time interval of a time domain of the first signal is modified. The first signal is then encoded by the first coding scheme. Therefore, the present invention is able to enhance coding efficiency according to a characteristic of a sound source.

Secondly, in an apparatus for processing a signal and method thereof, a signal corresponding to a partial frequency region of a downmix signal according to a characteristic of a signal is used as an extension base signal for bandwidth extension. Therefore, the present invention is able to reconstruct a high frequency region of a downmix signal having various bandwidths.

DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

Figure 1:
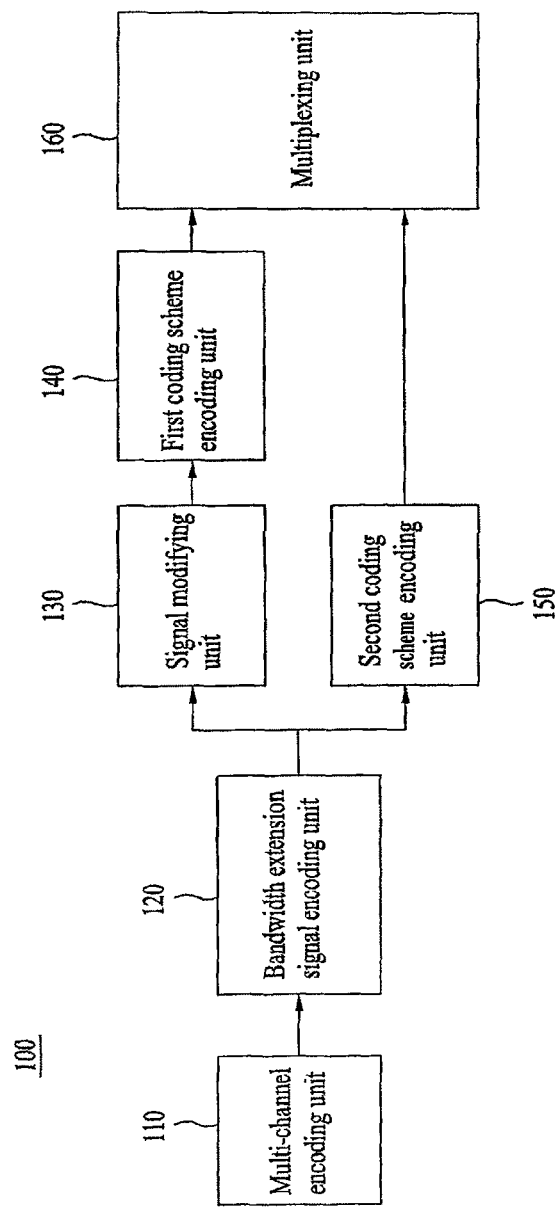
FIG. 1 is a schematic diagram of an apparatus for encoding a signal according to one embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing a signal according to the present invention includes receiving at least one selected from the group consisting of a first signal and a second signal, obtaining mode information and modification flag information indicating whether the first signal is modified, if it is determined as an audio coding scheme according to the mode information, decoding the first signal by the audio coding scheme, if the first signal is modified based on the modification flag information, reconstructing the first signal by applying modification reconstruction information to the first signal, determining an extension base signal corresponding to a partial region of the first signal based on extension information, and generating an extended downmix signal having a bandwidth extended by reconstructing a high frequency region signal using the extension base signal and the extension information.

According to the present invention, the audio coding scheme can include a coding scheme in a frequency domain based on time frequency transform and the speech coding scheme is a coding scheme based on a linear prediction coding scheme.

According to the present invention, the audio coding scheme can include reconstructing the first signal into a time domain and the modification reconstruction information is applied to the first signal.

According to the present invention, the modification flag information can indicate whether the first signal is modified in a time domain.

To further achieve these and other advantages and in accordance with the purpose of the present invention, a method of processing a signal includes receiving extension information and at least one downmix signal selected from the group consisting of a first signal decoded by a audio coding scheme and a second signal decoded by a speech coding scheme, determining an extension base signal corresponding to a partial region of the downmix signal, and generating an extended downmix signal having a bandwidth extended by reconstructing a high frequency region signal using the extension base signal and the extension information.

According to the present invention, a bandwidth of the high frequency region signal may not be equal to that of the extension base signal.

According to the present invention, the extension information may include at least one selected from the group consisting of a range of a filter applied to the downmix signal, a start frequency of the extension base signal and an end frequency of the extension base signal.

According to the present invention, the extension base signal may include a signal corresponding to a partial frequency region of the downmix signal.

According to the present invention, the determining the extension base region using the extension information can be performed based on bandwidth extension flag information indicating whether the high frequency region signal of the downmix signal is reconstructed using the extension information.

To further achieve these and other advantages and in accordance with the purpose of the present invention, an apparatus for processing a signal includes a signal receiving unit receiving extension information and at least one downmix signal selected from the group consisting of a first signal decoded by a audio coding scheme and a second signal decoded by a speech coding scheme, an extension base region determining unit determining an extension base signal in the downmix signal, and a high frequency region signal reconstructing unit generating an extended downmix signal having a bandwidth extended by reconstructing a high frequency region signal using the extension base signal and the extension information.

It is to be understood that both the foregoing general description and the following detailed description are exemplary and explanatory and are intended to provide further explanation of the invention as claimed.

DESCRIPTION OF THE EMBODIMENTS

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

First of all, it is understood that the concept 'coding' in the present invention includes both encoding and decoding.

Secondly, 'information' in this disclosure is the terminology that generally includes values, parameters, coefficients, elements and the like and its meaning can be construed as different occasionally, by which the present invention is non-limited. Stereo signal is taken as an example for a signal in this disclosure, by which examples of the present invention are non-limited. For example, a signal in this disclosure may include a multi-channel signal having at least three or more channels.

In this disclosure, a first signal indicates a signal coded by a first coding scheme and a second signal indicates a signal coded by a second coding scheme. The first signal can include an audio signal and the second signal can include a speech signal, by which the present invention is non-limited. Moreover, a first coding scheme described in the following description is used to have the same meaning of an audio coding scheme and a second coding scheme will be used to have the same meaning of a speech coding scheme.

FIG. 1 shows a signal encoding apparatus 100 according to an embodiment of the present invention. Referring to FIG. 1, a signal encoding apparatus 100 includes a multi-channel encoding unit 110, a bandwidth extension signal encoding unit 120, a signal modifying unit 130, a first coding scheme encoding unit 140, a second coding scheme encoding unit 150 and a multiplexing unit 160.

The multi-channel encoding unit 110 receives an input of a signal having a plurality of channels (hereinafter abbreviated multi-channel). The multi-channel encoding unit 110 generates a downmix signal by downmixing on the inputted multi-channel signal and also generates spatial information corresponding to the multi-channel signal. The spatial information can include channel level difference information (CLD), a channel prediction coefficient (CPC), inter-channel correlation information (ICC), downmix gain information (DMG) and the like.

The bandwidth extension signal encoding unit 120 receives an input of the downmix signal, removes a region corresponding to a high frequency, and then encodes a signal corresponding to a low frequency region only. The bandwidth extension signal encoding unit 120 generates extension information corresponding to the removed high frequency region, includes it in the spatial information, and then transfers the extension information includes in the spatial information. Details of this process shall be described with reference to FIG. 2 and FIG. 3 later.

It is determined whether to code an input signal by a first coding scheme or a second coding scheme based on a characteristic of the signal. And, mode information determining the coding scheme is generated (not shown in the drawing). In this case, the first coding scheme may correspond to an audio coding scheme (audio signal scheme). The audio coding scheme can include the scheme using MDCT (modified discrete cosine transform), by which the present invention is non-limited. The second coding scheme can correspond to a speech coding scheme. The speech coding scheme may follow AMR-WB (adaptive multi-rate wide-band) standard, by which the present invention is non-limited. And, the mode information can include a first mode indicating that coding is performed by the first coding scheme and a second mode indicating that coding is performed by the second coding scheme.

The signal modifying unit 130 receives an input of the signal determined to be coded by the first coding scheme, generates modification reconstruction information based on a characteristic of the signal (e.g., signal size, segment length, etc.) before the signal is coded according to the first coding scheme, and then applies the modification reconstruction information to modify the corresponding signal. Details of this process shall be described with reference to FIG. 4 and FIG. 5 later.

The first coding scheme encoding unit 140 encodes the signal modified by the signal modifying unit 130 according to the first coding scheme. The signal generated by the first coding scheme encoding unit 140 is named a first signal. The first signal may include an audio signal or may further include a little speech signal. And, the first coding scheme encoding unit 140 may include a frequency domain encoding unit.

The second coding scheme encoding unit 150 encodes a signal according to the second coding scheme based on the characteristic of the signal. The signal generated by the second coding scheme encoding unit 150 is named a second signal. The second signal may include a speech signal or may further include a little audio signal. The second coding scheme encoding unit 150 can further use a linear prediction coding (LPC) scheme. In case that an input signal has high redundancy on a temporal axis, it can be modeled by linear prediction for predicting a current signal from a past signal. In this case, coding efficiency can be raised by adopting the linear prediction coding scheme. Moreover, the second coding scheme encoding unit 150 can include a time domain encoding unit.

The multiplexing unit 160 generates a bitstream to transport using the spatial information including encoded mode information, modification reconstruction information and extension information, the first signal and the second signal. In doing so, the mode information can be represented as flag information. Moreover, modification flag information is further included to indicate whether a signal has been modified by the signal modifying unit 130.

Figure 2:
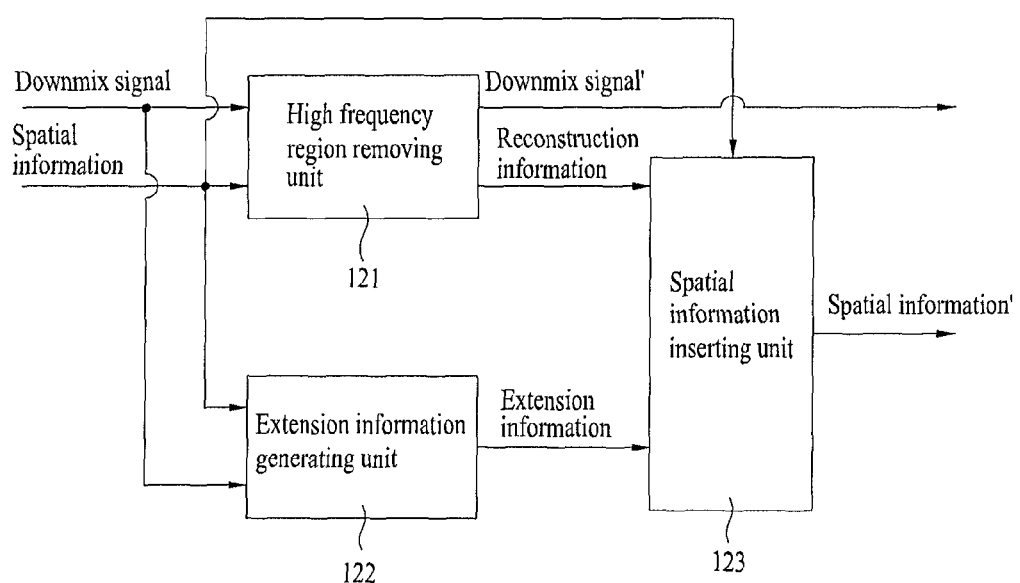
FIG. 2 is a schematic diagram of a bandwidth extension encoding unit according to one embodiment of the present invention.
Figure 3:
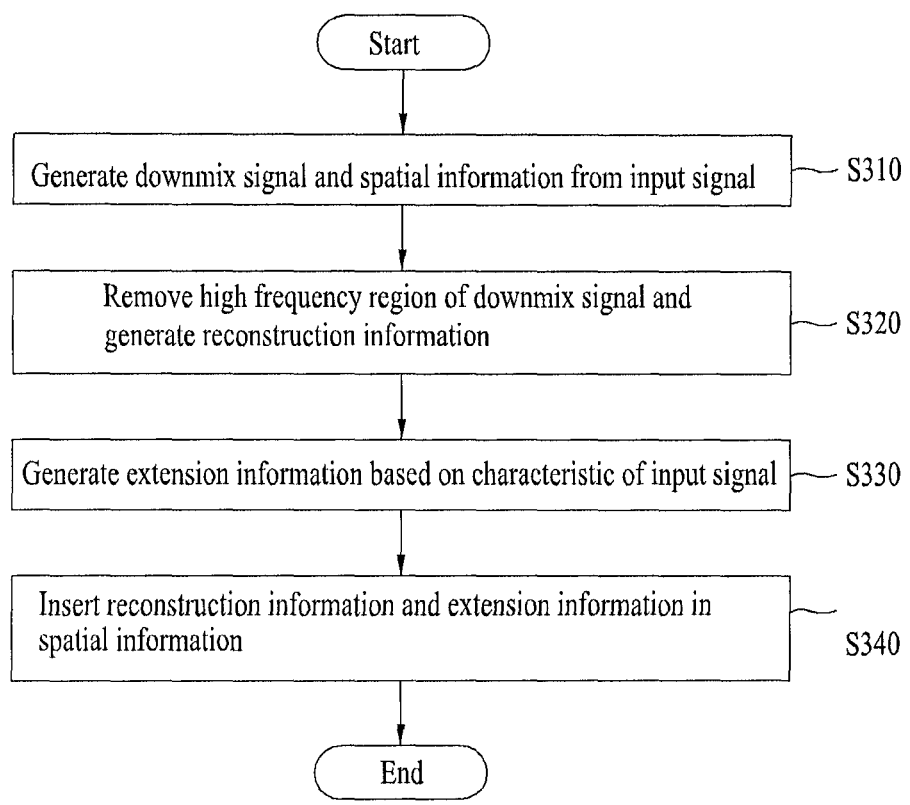
FIG. 3 is a flowchart for a method of encoding a signal in the bandwidth extension encoding unit shown in FIG. 2.

FIG. 2 shows a bandwidth extension encoding unit 120 according to one embodiment of the present invention, and FIG. 3 is a flowchart for a method of encoding a signal in the bandwidth extension encoding unit 120.

Referring to FIG. 2, the bandwidth extension encoding unit 120 includes a high frequency region removing unit 121, an extension information generating unit 122 and a spatial information inserting unit 123.

The high frequency region removing unit 121 receives the downmix signal and spatial information generated by the multi-channel encoding unit 110. In this case, the downmix signal can include a signal in a frequency domain and can include a low frequency signal and a high frequency signal. The high frequency region removing unit 121 generates a removed downmix signal and reconstruction information including start and end frequencies of the high frequency region, which the removed downmix signal is generated by removing a high frequency signal of a high frequency region from a frequency signal of the downmix signal (hereinafter, 'downmix signal' indicates a downmix signal having a low frequency signal removed a high frequency signal by the high frequency region removing unit 121).

It is able to determine the reconstruction information based on the characteristic of the input signal. The start frequency of the high frequency signal is the frequency that corresponds to a half of a whole bandwidth of the input signal. On the contrary, the reconstruction information is able to determine a start frequency as a frequency identical to or higher than a half of a whole bandwidth or a frequency identical to or lower than a half of a whole bandwidth according to a characteristic of an input signal. For instance, if case that using a whole bandwidth signal of the downmix signal for the multi-channel encoded downmix signal is more efficient than encoding by removing a high frequency region using a bandwidth extension technique, the reconstruction information is able to indicate a frequency located at an end portion of a bandwidth using the start frequency. It is able to determine the reconstruction information using at least one of a signal size, a length of a segment used in case of coding and a type of source, by which the present invention is non-limited.

The extension information generating unit 122 generates extension information determining an extension base signal, which is to be used for decoding, using the downmix signal and the spatial information. The extension base signal is a frequency signal of a downmix signal used to reconstruct the high frequency signal of the downmix signal, which was removed by the high frequency region removing unit 121 in encoding. And, the extension base signal can include a low frequency signal or a partial signal of a low frequency signal.

The extension information can match information of the downmix signal remaining by the high frequency region removing unit 121, by which the present invention is non-limited. For instance, the extension information can include the information corresponding to a partial signal of the downmix signal. In case that the extension information is the information corresponding to the partial signal of the downmix signal, the extension information can include a start frequency of the extension base signal and an end frequency of the extension base signal. And, the extension information is able to further include a range of a filter applied to the frequency signal of the downmix signal.

The spatial information inserting unit 123 generates spatial information configured in a manner that the reconstruction information generated by the high frequency region removing unit 121 and the extension information generated by the extension information generating unit 122 are inserted in the spatial information generated by the multi-channel encoding unit 110.

Referring to FIG. 3, first of all, a downmix signal and spatial information are generated from an input signal [S310]. A high frequency region of the downmix signal is removed and reconstruction is generated [S320]. As mentioned in the foregoing description, the reconstruction information can be determined using at least one of a signal size, a length of a segment used in case of coding and a type of a sound source. And, the reconstruction information indicates start and end frequencies of the removed signal.

Subsequently, extension information for determining an extension base signal to be used for decoding is generated using the downmix signal and the spatial information based on a characteristic of the input signal [S330]. The extension information can be the information corresponding to a partial signal of the downmix signal. The extension information can include a start frequency of the extension base signal and an end frequency of the extension base signal and is able to further include a range of a filter applied to a frequency signal of the downmix signal. And, it is able to insert the reconstruction information and the extension information in the spatial information [S340].

The signal encoding apparatus 100 according to one embodiment of the present invention variably determines a high frequency region signal of a downmix signal which is removed by the bandwidth extension encoding unit 120, thereby being able to perform coding more efficiently according to a characteristic of an input signal. The signal encoding apparatus 100 according to one embodiment of the present invention generates and transfers extension information, thereby being able to variably use a low frequency signal for reconstruction of a high frequency region signal.

Figure 4:
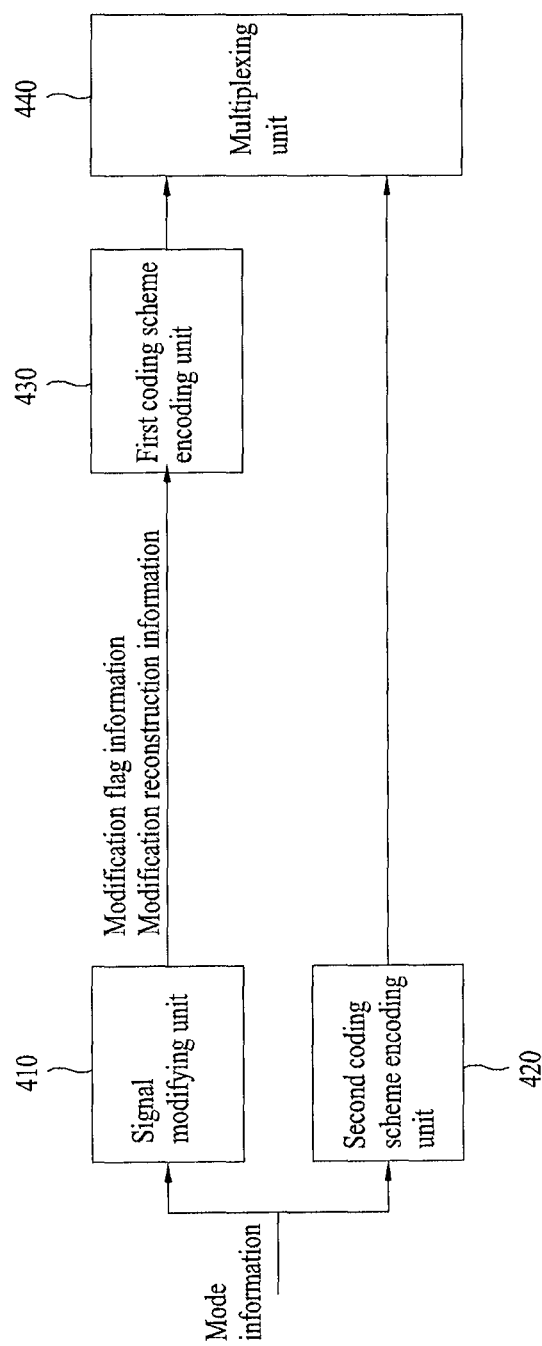
FIG. 4 is a partial schematic diagram of the signal encoding apparatus shown in FIG. 1 according to another embodiment of the present invention.
Figure 5:
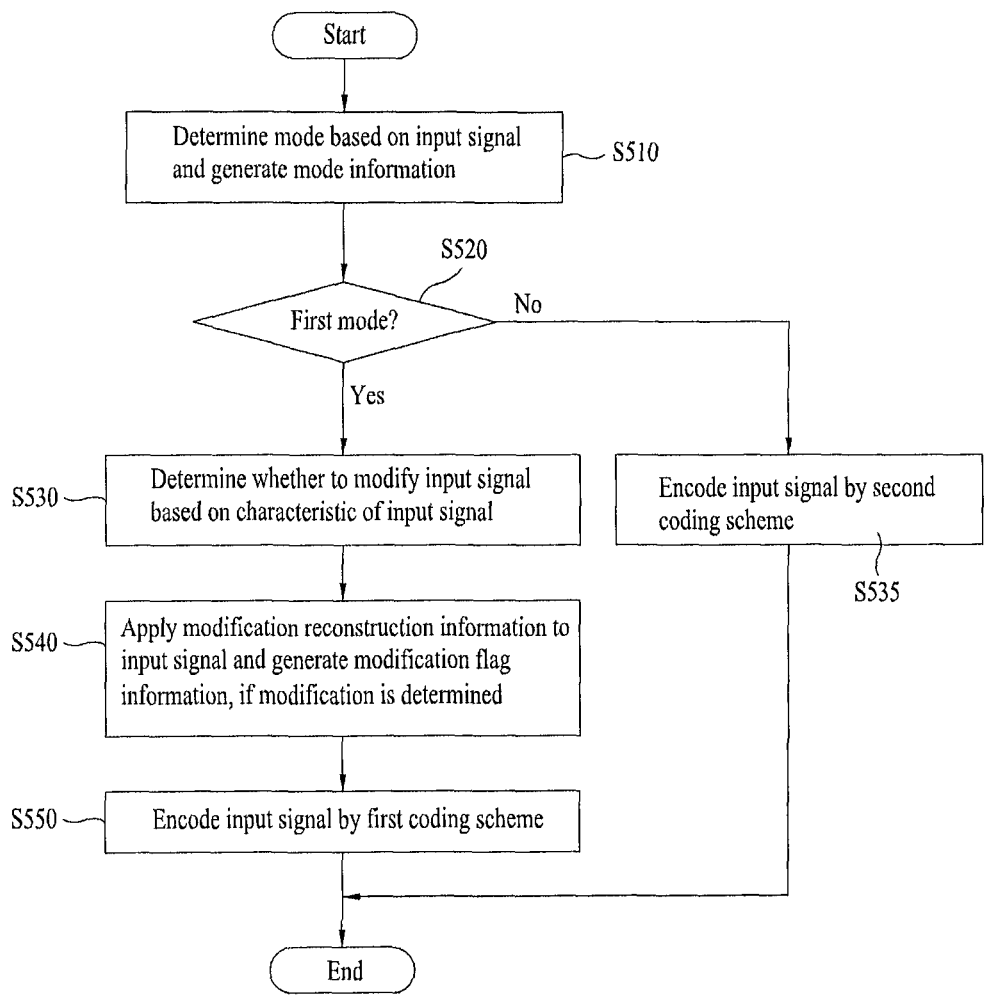
FIG. 5 is a flowchart for a method of encoding a signal in the signal encoding apparatus shown in FIG. 2.

FIG. 4 is a partial schematic diagram of the signal encoding apparatus shown in FIG. 1 according to another embodiment of the present invention, and FIG. 5 is a flowchart for a method of encoding a signal according to another embodiment of the present invention.

Referring to FIG. 4, according to mode information indicating a coding scheme of an input signal, it is determined whether to code an input signal by a first coding scheme or a second coding scheme. If the second coding scheme is determined, a second coding scheme encoding unit 420 is identical to the second coding scheme encoding unit 150 of the signal encoding apparatus 100. Its details shall be omitted.

If the input signal is determined to be coded by the first coding scheme according to the mode information, a signal modifying unit 410 modifies the signal based on a characteristic of the input signal. The characteristic can include a size of the signal, a length of segment segmented in coding, or the like. For instance, since a size of a transform unit of MDCT used by the first coding scheme encoding unit is different from a size of segment used for coding of a speech signal, efficiency in coding may be considerably reduced. If so, by modifying the size of the segment or a size of window applied by a first coding scheme encoding unit 430, the signal modifying unit 410 is able to enhance coding efficiency of the first coding scheme encoding unit 430. In order to modify the size of the segment or the size of the applied window, it is able to adjust a time unit interval in a time domain. In doing so, it is able to generate information required for generating a modified signal as modification reconstruction information. Moreover, the signal modifying unit 410 is able to generate modification flag information indicating whether a signal is modified.

If the first coding scheme is determined, the first coding scheme encoding unit 430 is identical to the first signal coding scheme encoding unit 140 of the signal encoding apparatus 100 and a multiplexing unit 440 is identical to the multiplexing unit 160 of the signal encoding apparatus. Hence, their details will be omitted in the following description.

Referring to FIG. 5, a mode is determined based on a characteristic of an input signal. Mode information indicating the determined mode is then generated [S510]. In this case, the mode information can indicate a first mode following the first coding scheme or a second mode following a second coding scheme. Subsequently, it is determined whether the mode information indicates the first mode [S520].

If the mode information indicates the first mode, it is determined whether to modify the input signal based on the characteristic of the input signal [S530]. As mentioned in the foregoing description, in order to determine whether modification is or not, it is able to consider a size of the input signal, a length of segment segmented for coding and the like. For instance, if a size of a window used by the first coding scheme encoding unit is different from that of a segment used for coding of the input signal or a pre-echo is generated, the input signal is modified and then encoded by the first coding scheme. Hence, the pre-echo is solved or the input signal can be more efficiently coded.

If the modification of the input signal is determined, the signal is modified by applying modification reconstruction information before the input signal is encoded by the first coding scheme. It is then able to generate modification flag information indicating whether the signal was modified [S540]. In this case, the modification reconstruction information may adjusts a length of a window applied in encoding by the first coding scheme. The modification reconstruction information may be applied in a time domain. The modification reconstruction information may be a gain value for adjusting a size of the input signal. In this case, the gain value can be determined based on a linear prediction domain coefficient (LPC).

The signal modified by applying the modification reconstruction information thereto is encoded by the first coding scheme [S550]. As mentioned in the foregoing description, the signal encoded by the first coding scheme can be a first signal. And, the first signal can include an audio signal or may further include a little audio signal.

Meanwhile, the signal, which is not determined as the first mode in the first mode determining steps S520, does not undergo a step of modifying a signal but is encoded by the second coding scheme [S535]. The encoded signal can be a second signal. And, the second signal can include a speech signal or may further include a little speech signal.

Figure 6:
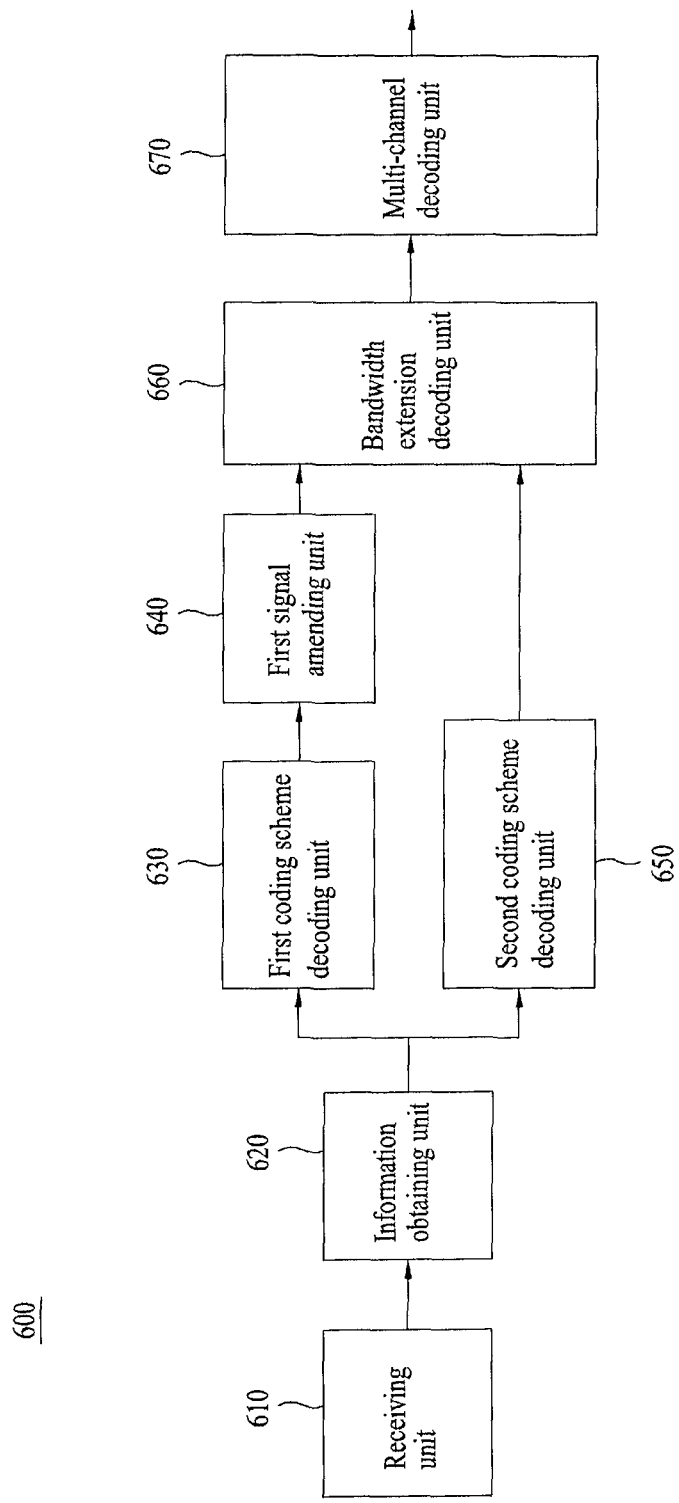
FIG. 6 is a schematic diagram of an apparatus for decoding a signal according to another embodiment of the present invention.

FIG. 6 shows an apparatus 600 for decoding a signal. Referring to FIG. 6, a signal decoding apparatus 600 includes a receiving unit 610, an information obtaining unit 620, a first coding scheme decoding unit 630, a first signal amending unit 640, a second coding scheme decoding unit 650, a bandwidth extension decoding unit 660 and a multi-channel decoding unit 670.

The receiving unit 610 is able to receive all signals encoded by the signal encoding apparatus 100. The receiving unit 610 is able to at least one of first and second signals. The receiving unit 610 is able to further receive at least one of mode information, modification flag information, extension information, a downmix signal and spatial information.

The information obtaining unit 620 is able to obtain mode information for determining a coding scheme, modification flag information indicating whether the first signal is modified, and extension information from the receiving unit 610.

The first coding scheme decoding unit 630 decodes the signal by the first coding scheme. The first coding scheme decoding unit 630 is able to decode the signal by modifying the signal using the modification reconstruction information. The signal decoded by the first coding scheme decoding unit 630 can be the first signal. In this case, the first signal can include an audio signal or can further include a little speech signal. The first coding scheme decoding unit 630 is an audio coding scheme decoding unit and can include a frequency domain decoding unit. And, the first coding scheme decoding unit 630 is able to use MDCT.

The first signal modifying unit 640 modifies the first signal only if the first signal is modified in encoding based on the modification flag information. The first signal modifying unit 640 is able to use modification reconstruction information to apply to the first signal. Details for this process will be explained with reference to FIG. 7 and FIG. 8 later.

The second coding scheme decoding unit 650 decodes the signal by the second coding scheme. The signal decoded by the second coding scheme decoding unit 650 can be the second signal. In this case, the second signal can include a speech signal or can further include a little audio signal. The second coding scheme decoding unit 650 can be a speech coding scheme decoding unit. The second coding scheme decoding unit 650 can include a time domain decoding unit which is able to further use a linear prediction coding (LPC) scheme.

The bandwidth extension decoding unit 660 receives at least one downmix signal of the signal decoded by the first coding scheme decoding unit 630 and the signal decoded by the second coding scheme decoding unit 650 and is then able to reconstruct a signal corresponding to a high frequency region removed in the encoding. Details for this process will be explained later with reference to FIGS. 11 to 13.

The multi-channel decoding unit 670 receives the downmix signal having the high frequency region reconstructed and the spatial information and then decodes the signal having multi-channels by applying the spatial information to the downmix signal.

Figure 7:
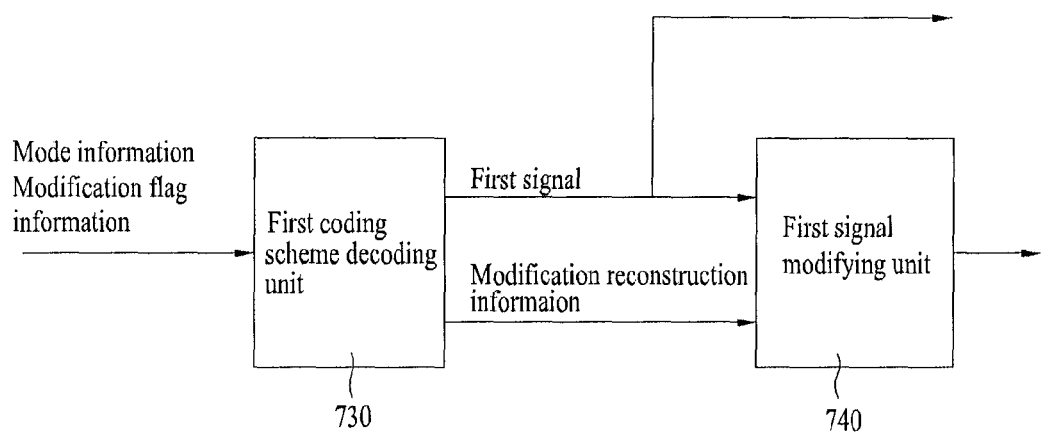
FIG. 7 is a schematic diagram for signal flows in a first coding scheme decoding unit and a first signal amending unit according to another embodiment of the present invention.
Figure 8:
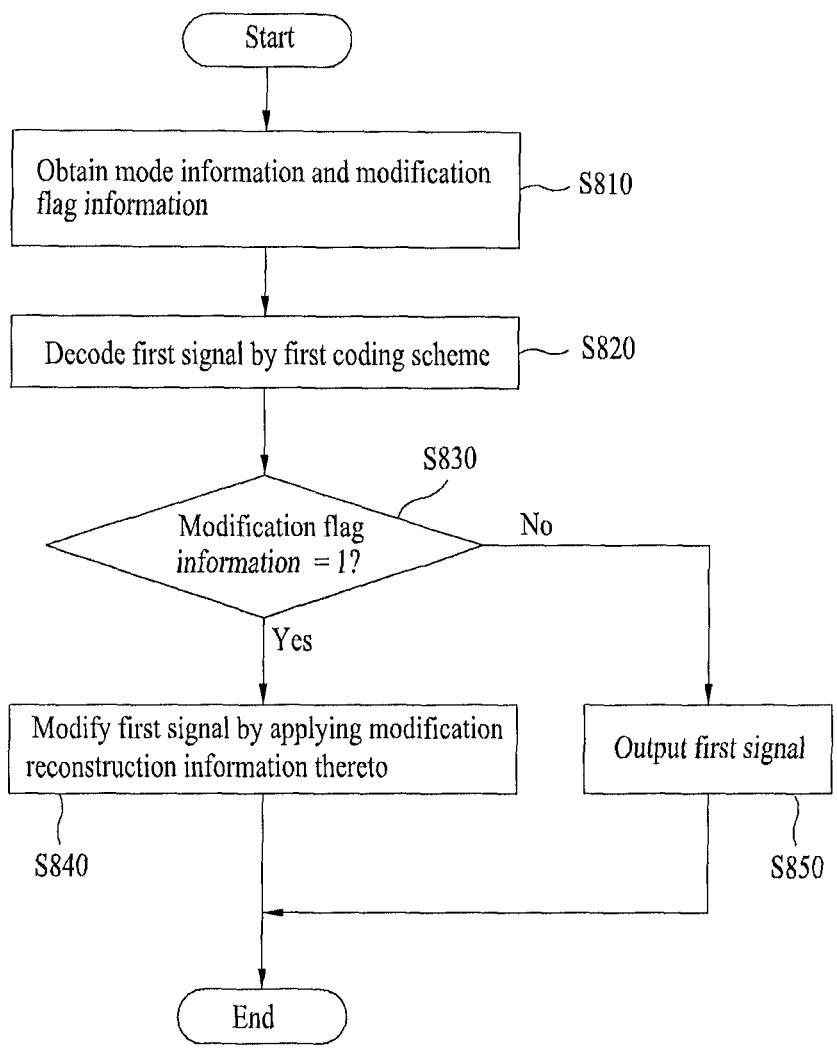
FIG. 8 is a flowchart for a signal decoding method according to FIG. 7.

FIG. 7 is a schematic diagram for signal flows in a first coding scheme decoding unit and a first signal amending unit according to another embodiment of the present invention, and FIG. 8 is a flowchart for a signal decoding method according to FIG. 7.

First of all, referring to FIG. 7, mode information and modification flag information are inputted to a first coding scheme decoding unit 730. The modification flag information indicates whether the first signal is modified in case of encoding. In particular, the modification flag information indicates whether the first signal is modified in time domain or frequency domain. If it is determined that the first signal is not modified based on the modification flag information, the first signal is decoded by a first coding scheme decoding unit 730 according to a first coding scheme and is then outputted without being inputted to a first signal modifying unit 740. As mentioned in the foregoing description, the first coding scheme decoding unit 730 decodes according to an audio coding scheme.

If it is determined that the first signal is modified based on the modification flag information, the inputted first signal is decoded by the first coding scheme simultaneously with modification reconstruction information is generated. In case that the modification reconstruction information is transferred from an encoder, it is able to extract the modification reconstruction information from a bitstream. On the contrary, if the modification reconstruction information is not transferred from the encoder, it may possible that the modification reconstruction information is generated by the first coding scheme decoding unit 730 based on a characteristic of the first signal. The modification reconstruction information may be provided for the first signal to adjust a time unit interval in a time domain in the encoding according to the first coding scheme. The modification reconstruction information may be provided to adjust a length of a window applied to the first signal. The modification reconstruction information can be the information applied in the time domain. Moreover, the modification reconstruction information can be a gain value for adjusting a size of the input signal. In this case, the gain value can be determined based on a linear prediction domain coefficient (LPC).

The first signal modifying unit 740 receives the modification reconstruction information and the first signal and is then able to decode an original signal by reconstruct the modified time unit interval of the first signal in the time domain.

Referring to FIG. 8, first of all, mode information and modification flag information are obtained [S810]. If the mode information indicates a first mode, a first signal is decoded by a first coding scheme [S820]. Subsequently, the modification flag information indicating whether the first signal is modified is obtained [S830]. If the modification flag information is set to 1 ['yes' in the step S830], the first signal is modified by applying modification reconstruction information [S840]. As mentioned in the foregoing description, the modification reconstruction information can be the value for adjusting a time unit interval in a time domain of the first signal, a gain value for adjusting a size of the first signal, or a value for adjusting a length of a window applied to the first signal.

On the contrary, if the modification flag information is not set to 1 ['no' in the step S830], the first signal can be outputted intact without being amended [S840].

Thus, in the signal decoding apparatus and method according to the present invention, when a first signal decoded by a first coding scheme is encoded, if a time unit interval in a time domain is modified, the modified first signal can be reconstructed into a signal before modification using modification reconstruction information. Therefore, decoding can be efficiently performed according to a characteristic of the signal.

Meanwhile, if a first signal is transformed in a transition interval by a first coding scheme encoding unit using a window having a length longer than that of the signal, it is able to control noise by bit allocation in a frequency domain. On the other hand, since noise is evenly distributed within a window in a time domain, if signal having a low energy level is located at a front position, the noise is relatively louder than signal, whereby pre-echo effect for a user to hear the noise is generated.

Therefore, according to another embodiment of the present invention, a method of adjusting noise (noise shaping) in a time domain like a frequency domain of a related art is proposed to solve the pre-echo problem.

Figure 9:
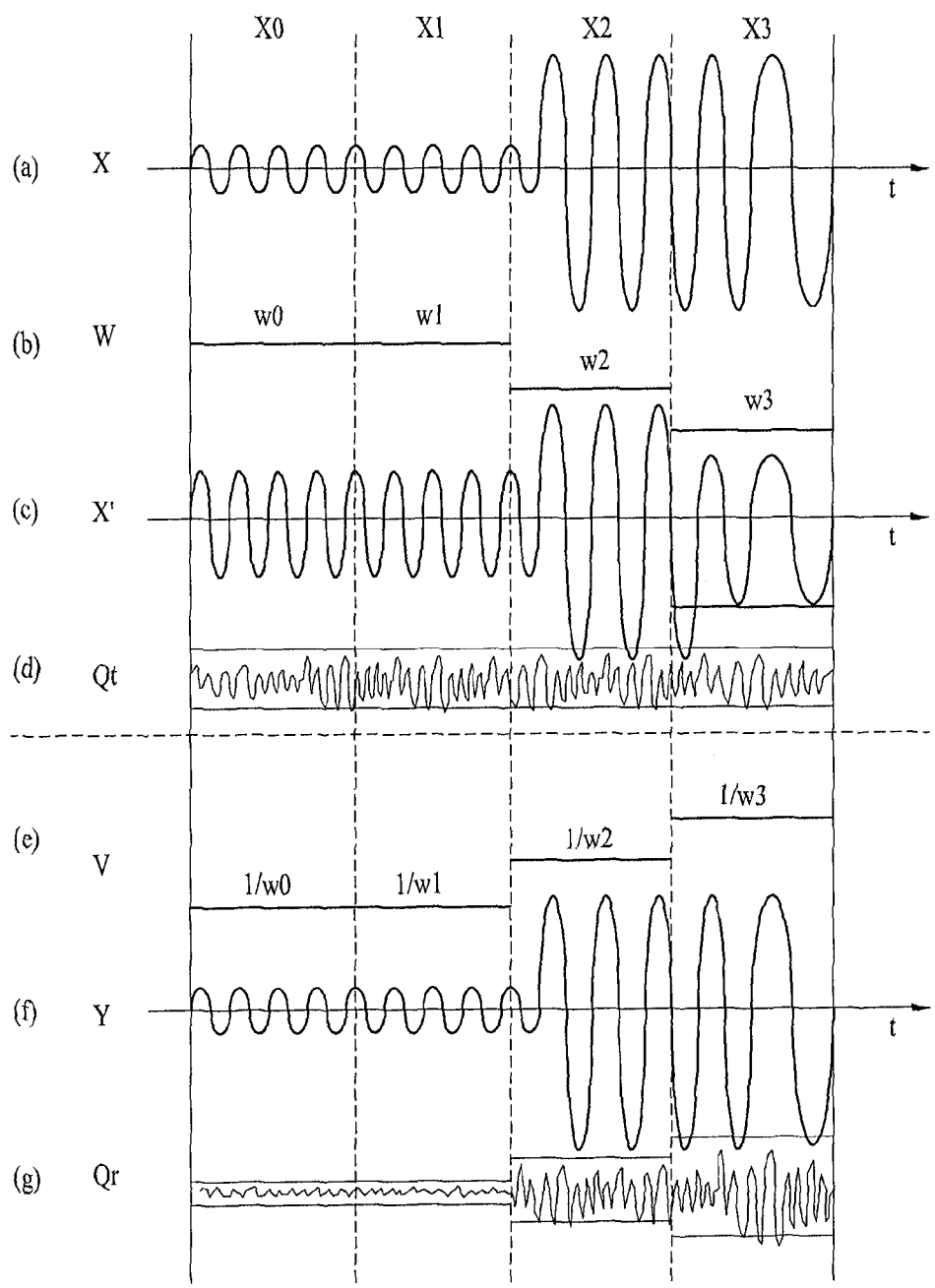
FIGS. 9A to 9G are diagrams for a method of processing a modified signal according to another embodiment of the present invention.

FIG. 9 shows a method of processing a first signal according to another embodiment of the present invention. FIGS. 9A to 9D show a method of encoding a first signal according to another embodiment of the present invention. FIGS. 9E to 9G show a decoding method corresponding to the encoding method.

In FIG. 9A, an input signal x(t) is divided into signal unit X for processing in a time domain. Referring to FIG. 9A, the input signal x(t) can be segmented into four sub-blocks. Signals corresponding to the sub-blocks may include segmented signals X0, X1, X2 and X3, respectively. Referring to FIG. 9B, it is able to determine modification reconstruction information W (w0, w1, w2, w3) for adjusting a sizes of each of the segmented signals of the sub-blocks in the time domain. The modification reconstruction information can be a gain value in a time domain determined per segmented signal. In this case, the gain value may be a value actually applied to the segmented signal or configured in a form reverse to the value applied to the segmented signal. If the gain value applied to the segmented signal gets greater, quantization is performed using more bits. Therefore, smaller quantization noise can be generated.

Referring to FIG. 9C, it is able to generate a modification signal X' by applying the modification reconstruction information (w0, w1, w2, w3) to the segmented signal (X0, X1, X2, X3). FIG. 9D shows a quantization noise Qt obtained from performing perceptual coding using a frequency domain masking characteristic of a related art by using the modification signal which is converted to frequency domain. Illustrated to FIG. 9D, the quantization noise can be a signal having evenly distributed energy in a whole time domain. Moreover, it may be preferable that psychoacoustic model operation for bit allocation in frequency domain uses the segmented signal X instead of the modification signal X'.

After the first signal transferred to the decoder side has been reconstructed in the frequency domain, if the reconstructed signal is inverted, it is able to obtain a transport signal that the quantization noise Qt is included in the adjustment signal X' [not shown in the drawing].

FIG. 9E shows the modification reconstruction information V applied to the transport signal. The modification reconstruction information V can be a value (1/w0, 1/w1, 1/w2, 1/w3) inverse to the gain value applied to the block signal.

FIG. 9F shows a reconstructed signal Y obtained from applying the modification reconstruction information V to the transport signal. The reconstructed signal V may be the signal having the same shape of the modification signal X' in the encoder side. Yet, as the quantization noise Qt encoded according to the modification reconstruction information is adjusted, as shown in FIG. 9G, it is able to obtain an adjusted quantization noise Qr that is adjusted in a time domain.

Therefore, according to another embodiment of the present invention, modification reconstruction information applied to a signal in a time domain is determined and temporal bit allocation information of each block can be then determined using the modification reconstruction information. Moreover, by reducing a energy level of quantization noise in a region having a small energy level of signal, it is able to prevent pre-echo effect.

Figure 10:
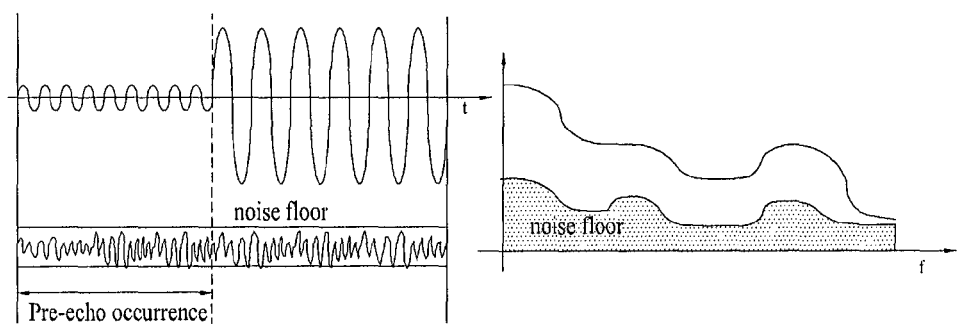
FIG. 10A and FIG. 10B are graphs of measuring a presence or non-presence of pre-echo occurrence before and after applying the signal processing method shown in FIG. 9.
Figure 10:
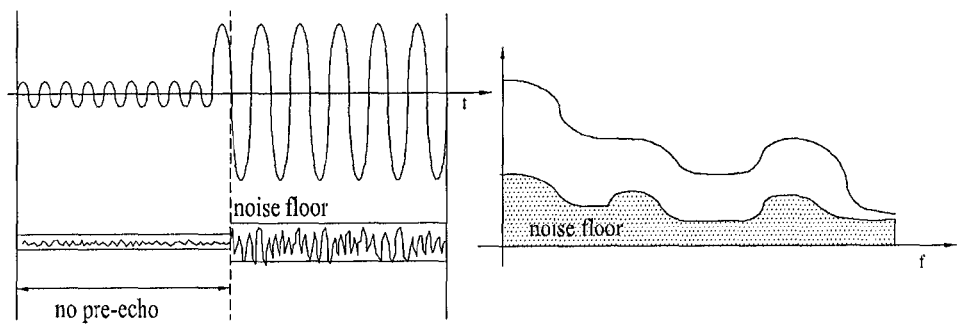

FIG. 10A and FIG. 10B are graphs of measuring a pre-echo occurrence before and after applying the signal processing method shown in FIGS. 9A to 9G.

Referring to FIG. 10A, since noise is evenly distributed across a whole band in a time domain in a conventional signal processor, if a signal having small energy level exists at a front portion of a signal, pre-echo effect occurs to enable a user hear the noise of the front portion.

Shown in FIG. 10B, if quantization noise is adjusted using modification reconstruction information in a time domain, a energy level of quantization noise in a region where exists signal having small energy level is adjusted to decrease. Therefore, a problem of the pre-echo effect can be solved.

Figure 11:
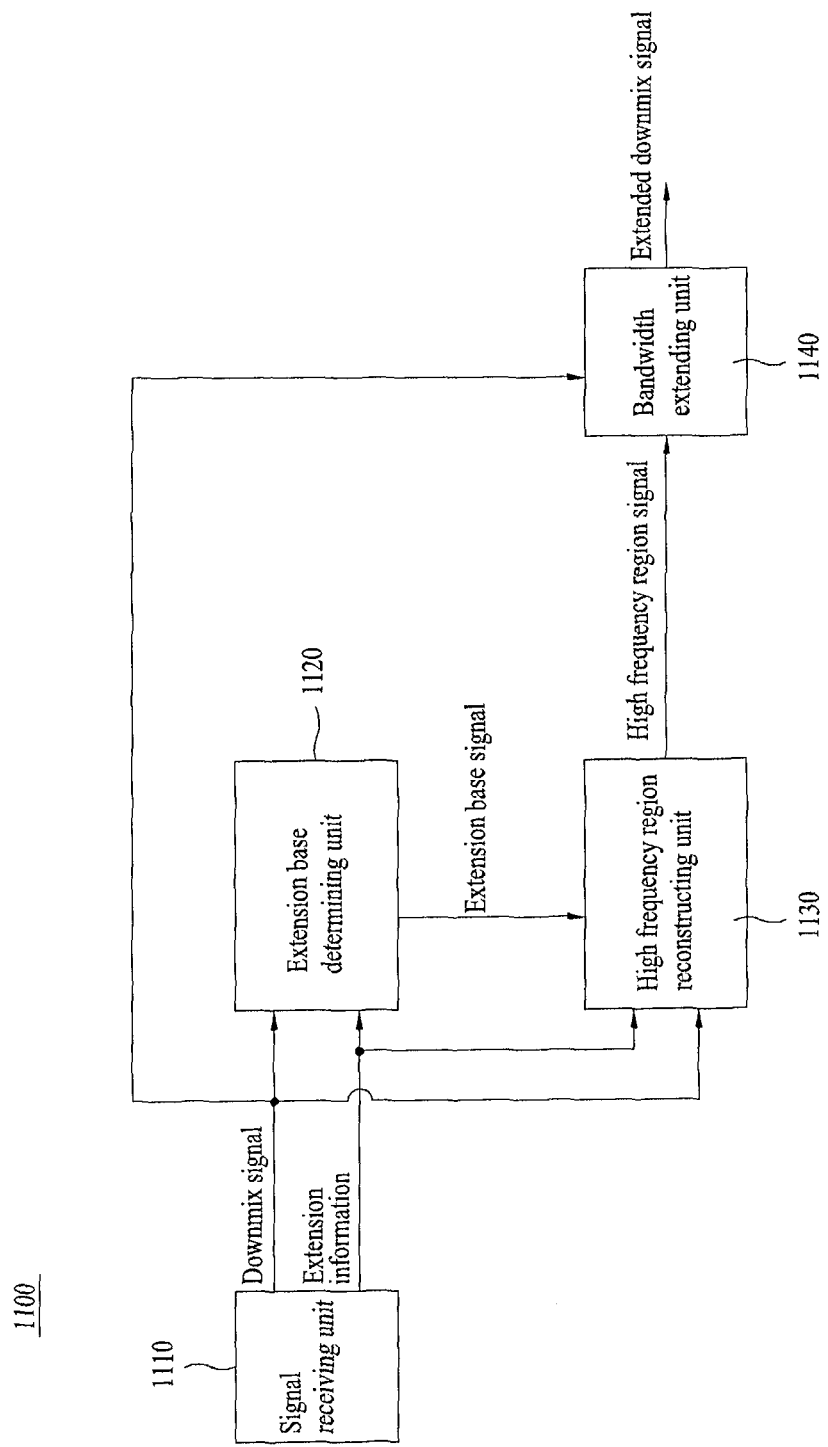
FIG. 11 is a schematic diagram of a bandwidth extension signal decoding unit according to another embodiment of the present invention.

FIG. 11 is a schematic diagram of a bandwidth extension signal decoding unit according to another embodiment of the present invention.

Referring to FIG. 11, a bandwidth extension signal decoding unit 110 includes a signal receiving unit 1110, an extension base region determining unit 1120, a high frequency region reconstructing unit 1130 and a bandwidth extending unit 1140.

The signal receiving unit 1110 receives at least one downmix signal of a first signal decoded by a first coding scheme and a second signal decoded by a second coding scheme and extension information. The downmix signal inputted to the signal receiving unit 1110 comprises the signal configured with a signal of a flow frequency region of an original signal in a manner that a high frequency region is removed by an encoder side.

The extension base region determining unit 1120 is able to determine an extension base signal of the downmix signal based on the extension information received by the signal receiving unit 1110. In this case, the downmix signal can be a signal appearing in a frequency domain and the extension base signal can be a signal located in a partial frequency region of the downmix signal in a frequency domain. The extension information is used to determine the extension base signal and may include start and end frequencies of the extension base signal or a range of a filter for filtering a portion of the downmix signal.

The high frequency region reconstructing unit 1130 receives the downmix signal and the extension information from the signal receiving unit 1110 and also receives the extension base signal from the extension base region determining unit 1120. The extension base signal is able to reconstruct a high frequency region signal of the downmix signal removed by the encoder side using the extension information. In doing so, it is able to further use the received reconstruction information. The high frequency region signal can be the signal that is included not in the downmix signal but in the original signal. As the high frequency region signal is reconstructed, it is able to generate an extended downmix signal of which bandwidth is extended.

The high frequency region signal may not be an integer multiple of the downmix signal. And, a bandwidth of the high frequency region signal may not be identical to that of the extension base signal.

In the signal processing apparatus and method according to one embodiment of the present invention, using not a whole downmix signal having a high frequency region removed by an encoder side as the extension base signal but a signal corresponding to a partial frequency region of the downmix signal, although a reconstructed high frequency region is not an integer multiple of the downmix signal, it is able to use a bandwidth extension technique.

The high frequency region reconstructing unit 1130 can further include a time-extended downmix signal generating unit and a frequency signal extending unit. The time-extended downmix signal generating unit is able to extend the downmix signal into a time domain by applying the extension information to the extension base signal. And, the frequency signal extending unit is able to extend a signal in a frequency domain of the downmix signal by decrementing the number of samples of the time-extended downmix signal (decimation).

Therefore, the bandwidth extension decoding unit 1100 according to another embodiment of the present invention, which further includes the time-extended downmix signal generating unit and the frequency signal generating unit, is able to adjust a bandwidth extended extent according to the modification reconstruction information.

If the high frequency region reconstructing unit 1130 includes not a low frequency region signal but a reconstructed high frequency region signal, the bandwidth extending unit 1140 generates an extended downmix signal of which bandwidth is extended in a manner that the bandwidth extending unit 1140 combines the downmix signal and the high frequency region signal together. In this case, the high frequency region signal may not correspond to an integer multiple of the downmix signal. Therefore, the bandwidth extension technique according to one embodiment of the present invention is usable for upsampling into a signal not in a multiple relation.

Figure 12:
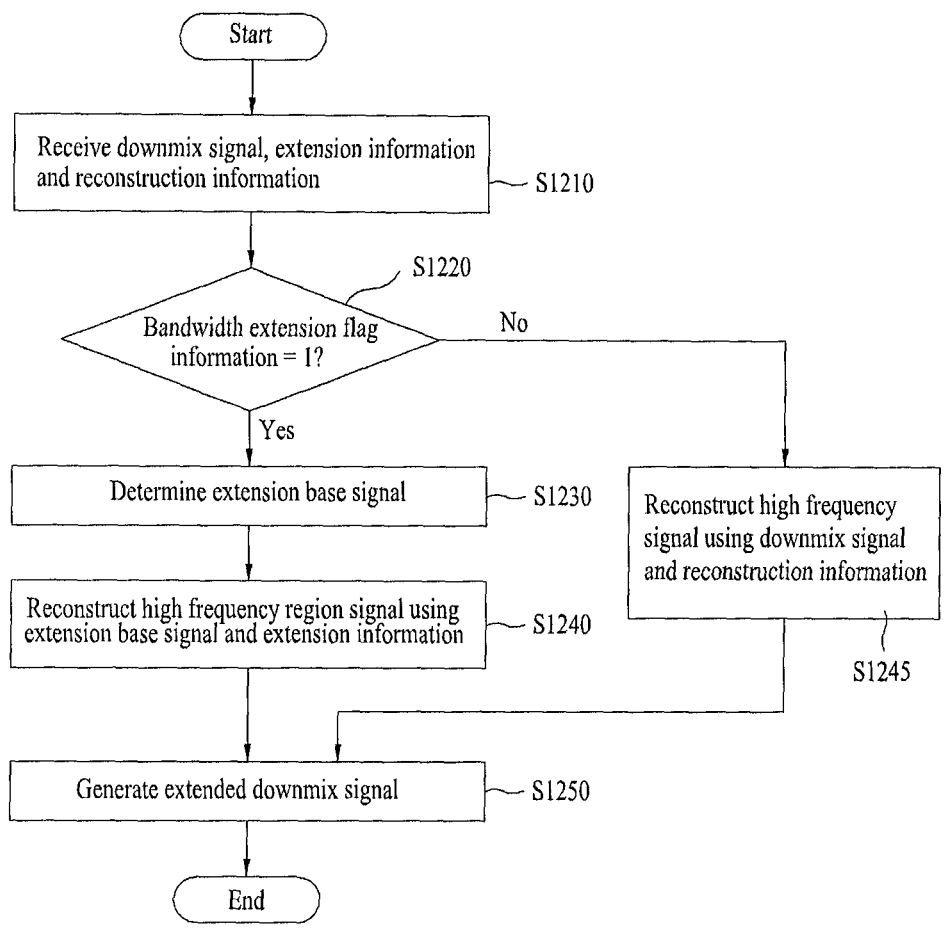
FIG. 12 is a flowchart for a signal decoding method in the bandwidth extension signal decoding unit shown in FIG. 11.
Figure 13:
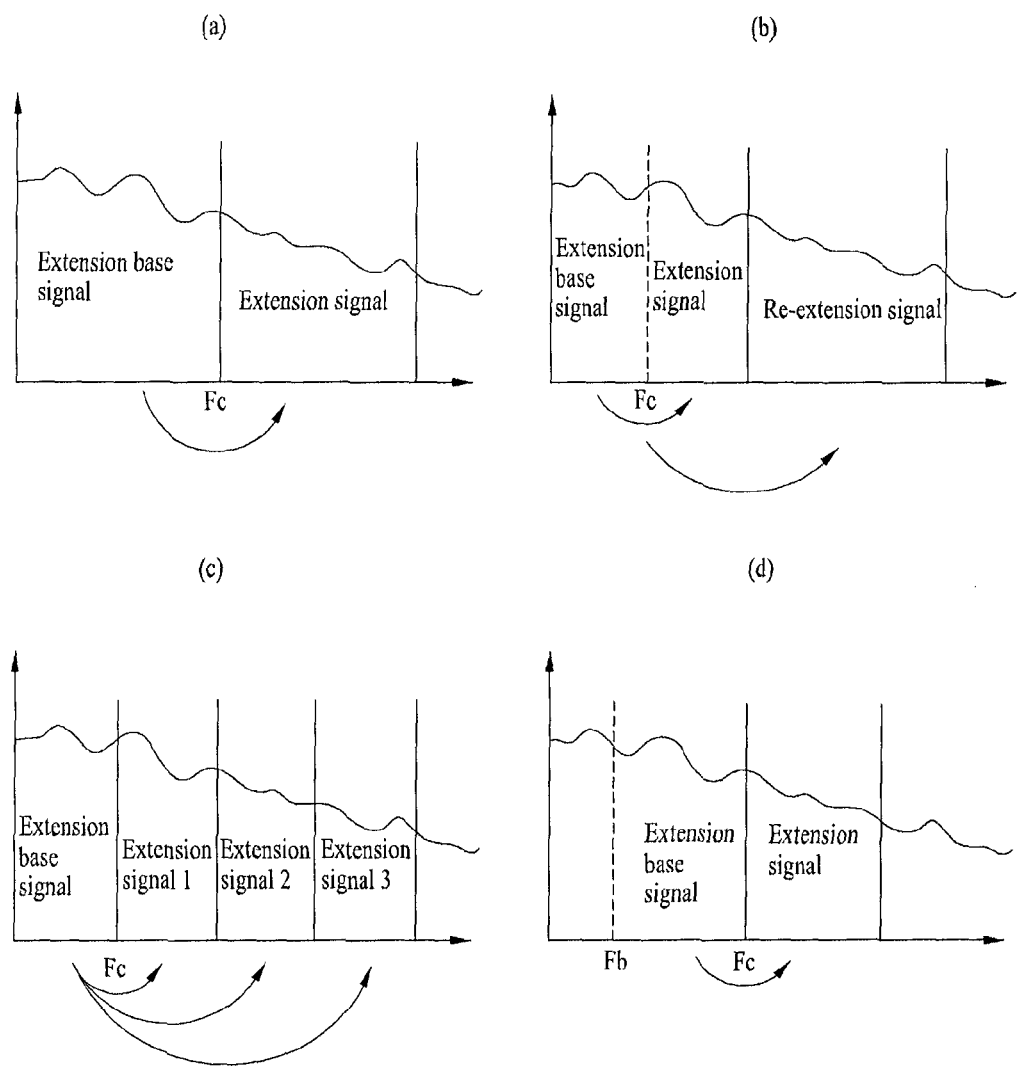
FIGS. 13A to 13D are diagrams for a method of generating a bandwidth extension signal according to another embodiment of the present invention.

FIG. 12 is a flowchart for a signal decoding method in a bandwidth extension signal decoding unit according to another embodiment of the present invention.

Referring to FIG. 12, a downmix signal and extension information are received [S1210]. In this case, the downmix signal can be a signal in a frequency domain or a signal that just includes a low frequency region signal that a high frequency region signal is removed from the downmix signal generated by an encoder side. And, the extension information can include at least one of a range of a filter applied to the downmix signal, a start frequency of an extension base signal and an end frequency of the extension base signal.

Subsequently, an extension base signal is determined using the downmix signal and the extension information [S1220]. In this case, the extension base signal can be a signal corresponding to a partial frequency region of the downmix signal. And, the determination of the extension base signal can be performed based on bandwidth extension flag information indicating whether the high frequency region signal of the downmix signal is reconstructed using the extension information. In particular, only if the bandwidth extension flag information is set to 1, it is able to determine the extension base signal.

A high frequency region signal is reconstructed using the extension base signal and the extension information [S1230]. In this case, the high frequency region signal may include a signal that is included not in the downmix signal transferred from the encoder side but in an original signal inputted to the encoder. As mentioned in the foregoing description, since the extension base signal is the signal corresponding not to the whole downmix signal but to a partial frequency region of the downmix signal, the high frequency region signal can be the signal that is not an integer multiple of the downmix signal.

Subsequently, by combining the downmix signal and the reconstructed high frequency region signal together, an extended downmix signal having an extended bandwidth is generated [S1240]. If the extension base signal is not determined based on the bandwidth extension flag information, i.e., if the bandwidth extension flag information is set to 0, a high frequency region signal is generated using the downmix signal and the reconstruction information [S1245]. And, an extended downmix signal is generated by combining the downmix signal and the high frequency region signal together [S1240]. In this case, the extended downmix signal can be a signal having a bandwidth amounting to an integer multiple of the downmix signal, and more particularly, to a twice of the downmix signal. Moreover, the generating the extended downmix signal [S1240] can be simultaneously with the reconstruction of the high frequency region signal instead of being separately performed.

FIGS. 13A to 13D are diagrams for a method of generating a bandwidth extension signal according to another embodiment of the present invention, in which 'Fc' indicates an end frequency of an extension base signal. FIG. 13A shows a bandwidth extension processing method according to a conventional method.

Referring to FIG. 13A, in encoding, a whole frequency band is divided by 2, an extension base signal (signal of a low frequency region corresponding to ½ of a whole frequency) is transferred by being encoded by a first or second encoding scheme, and an extension signal corresponding to a frequency region amounting to ½ of the whole signal is transferred by being encoded using extension information.

In decoding, a whole signal is reconstructed by decoding the extension signal using the extension base signal decoded by the first or second coding scheme and the extension information in a manner reverse to that of the encoding.

Referring to FIG. 13B, an extension base signal is encoded by selecting a signal corresponding to ¼ of a whole frequency band. A signal (extension signal 1) corresponding to ²⁄₄ to ¾ region of the whole frequency band is encoded as extension information using the extension base signal. And, a signal (re-extension signal) corresponding to ⁴⁄₄ region of the whole frequency band is encoded as extension information using the extension base signal.

Therefore, in performing decoding, the extension base signal is decoded by a first or second coding scheme and the extension signal 1 is then reconstructed using the extension base signal and the extension information. Subsequently, using the extension information and the extension signal 1, a re-extension signal corresponding to a high frequency region of the downmix signal is reconstructed. Therefore, it is able to raise a compression ratio using a signal corresponding to ¼ of a whole frequency region as an extension base signal only in performing bandwidth extension coding.

Referring to FIG. 13C, extension signal 1, extension signal 2 and extension signal 3, which correspond to ²⁄₄,¾ and ⁴⁄₄ regions, respectively, are encoded into extension information using an extension base signal corresponding to ¼ of a whole frequency region. In decoding, the extension signal 1, the extension signal 2 and the extension signal 3 are sequentially decoded using the extension base signal and the extension information.

In the bandwidth extending method according to another embodiment of the present invention, as shown in FIG. 13C, an extension base signal, an extension signal 1, an extension signal 2 and an extension signal 3 can have the same bandwidth, by which the present invention is non-limited. For instance, these signals can have bandwidths differing from each other. And, it is able to decode the extension signal 1, the extension signal 2 and the extension signal 3 by setting a scale factor of the extension base signal in a manner that a frequency region is amended large or small.

FIG. 13D shows a signal decoding method according to another embodiment of the present invention.

Referring to FIG. 13D, as an extension base signal, it is able to select a partial signal (one of Fb to Fc regions) of a signal decoded by a first or second coding scheme. Therefore, it is able to reconstruct a high frequency region, which does not correspond to an integer multiple of a downmix signal encoded using the extension base signal.

FIGS. 14A to 14D are diagrams for a method of generating a multi-channel signal according to a further embodiment of the present invention. In this case, a signal obtained by bandwidth extension is defined an extension signal, an extension signal 1 or an extension signal 2 and a signal obtained by channel extension through a multi-channel decoder or the like is named a stereo signal.

Figure 14:
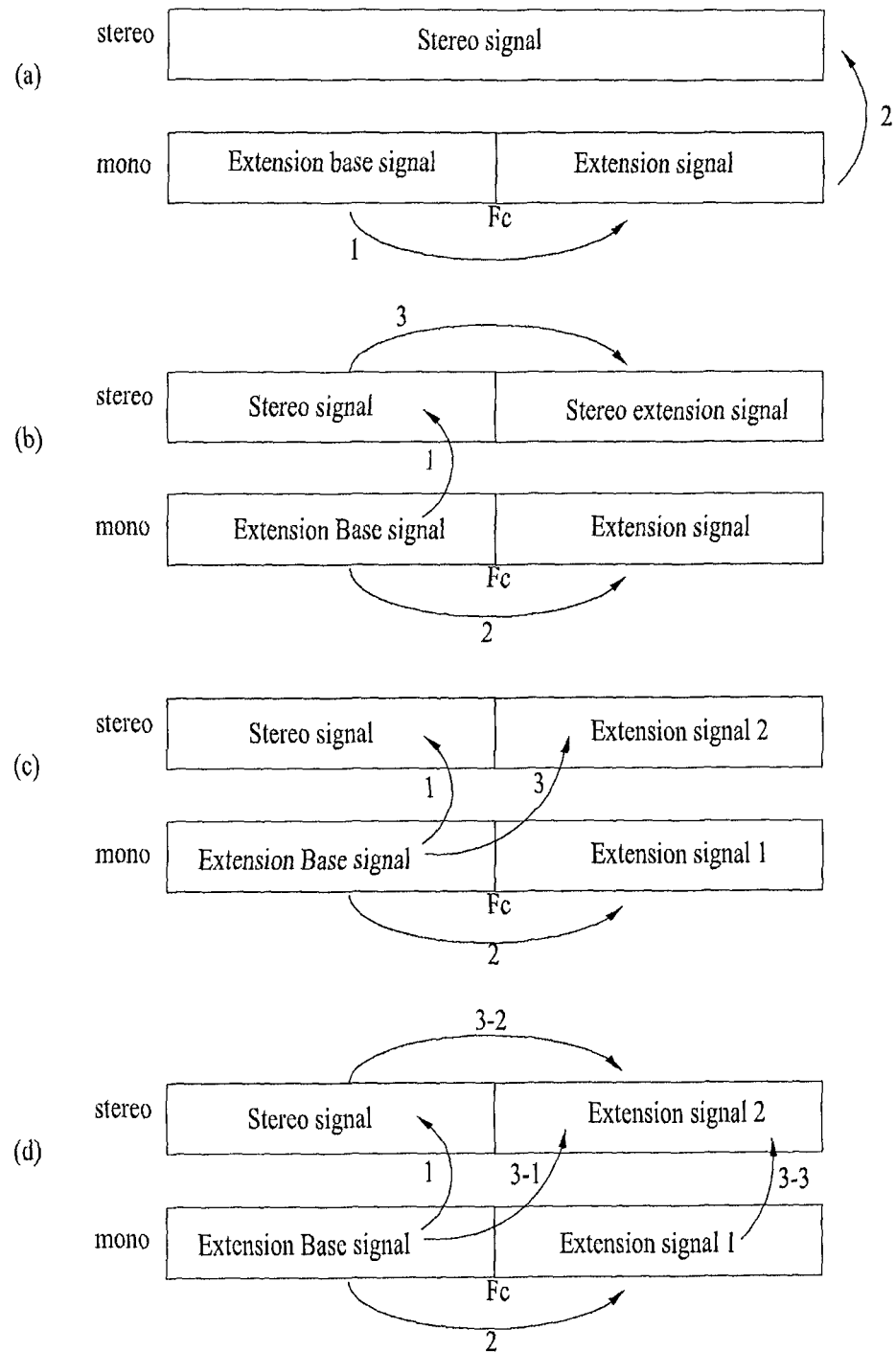
FIGS. 14A to 14D are diagrams for a method of generating a multi-channel signal according to a further embodiment of the present invention.

Referring to FIG. 14A, an extension base signal reconstructs a high frequency region signal of a downmix signal by bandwidth extension [Step 1]. Subsequently, a stereo signal is decoded from the reconstructed downmix signal by channel extension [Step 2].

Illustrated in FIG. 14B, a stereo signal is generated from an extension base signal by channel extension [Step 1]. Subsequently, by extending a bandwidth based on the stereo signal, a stereo signal of a whole frequency region is reconstructed [Step 2 and Step 3]. This is suitable for a signal having more information and sound images in a low frequency region of a whole downmix signal.

Referring to FIG. 14C, a stereo signal is generated from an extension base signal by channel extension in a manner similar to the former method [Step 1]. Subsequently, in order to reconstruct a stereo signal of a whole frequency region by extending a bandwidth, an extension signal 1 and an extension signal 2 are decoded using the extension base signal [Step 2 and Step 3]. Since the extension base signal is the signal having the core characteristic of the signal, it is preferable that the extension signal 2 is decoded from the extension base signal. In particular, it is suitable for decoding of a signal having high correlation between right and left channel signals of a stereo signal. For instance, it is suitable for decoding of a speech signal.

Referring to FIG. 14D, a stereo signal is decoded from an extension base signal by channel extension [Step 1]. An extension signal 1 is then decoded from the extension base signal by bandwidth extension [Step 2]. Subsequently, using the extension base signal, the extension signal 1 and the stereo signal, an extension signal 2 is reconstructed [Steps 3-1 to 3-3]. Therefore, it is able code a more organic stereo signal.

Figure 15:
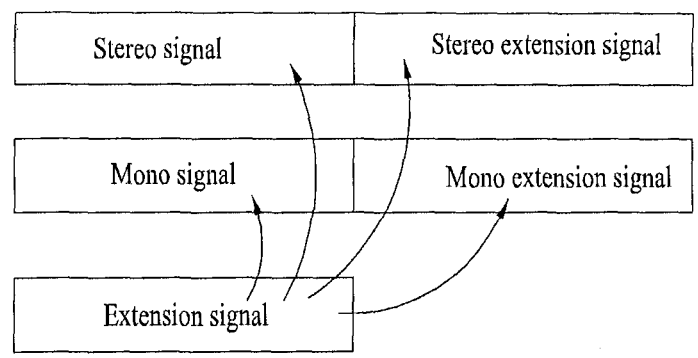
FIG. 15 is a diagram for a method of generating a multi-channel signal according to another further embodiment of the present invention.

FIG. 15 is a diagram for a method of generating a multi-channel signal according to another further embodiment of the present invention.

Referring to FIG. 15, a method of generating a multi-channel signal according to the present invention includes a method of reconstructing a mono signal, a mono extension signal, a stereo signal and a stereo extension signal using a base signal. In this case, the base signal can include a residual signal.

The present invention applied decoding/encoding method can be implemented in a program recorded medium as computer-readable codes. And, multimedia data having the data structure of the present invention can be stored in the computer-readable recoding medium. The computer-readable recording media include all kinds of storage devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, a bitstream generated by the encoding method is stored in a computer-readable recording medium or can be transmitted via wire/wireless communication network.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to encoding and decoding of signals.

The invention claimed is:

1. A method of processing a signal, the method comprising:
receiving a downmix signal including at least one of a first downmix signal decoded by an audio coding scheme and a second downmix signal decoded by a speech coding scheme;
determining an extension base signal corresponding to a partial region of the downmix signal based on extension information;
extending the extension base signal in a time domain;
generating a high frequency region of the downmix signal by decrementing a number of samples of the extended extension base signal; and
generating an extended downmix signal using the high frequency region of the downmix signal and the downmix signal,
wherein the extension information comprises at least one of a range of a filter applied to the downmix signal, a start frequency of the extension base signal and an end frequency of the extension base signal.

2. The method of claim 1, wherein a bandwidth of the high frequency region signal is not identical to that of the extension base signal.

3. The method of claim 1, wherein the extension base signal is a signal corresponding to a partial frequency region of the downmix signal.

4. The method of claim 1, further comprising:
after the generating the extended downmix signal, generating a high frequency region signal of the extended downmix signal using the extended downmix signal and the extension information; and
generating a re-extended downmix signal having an bandwidth extended by combining a frequency signal of the extended downmix signal and the high frequency region signal.

5. The method of claim 1, wherein the audio coding scheme comprises a coding scheme in a frequency domain using time-frequency transform and wherein the speech coding scheme is a coding scheme using a linear prediction coding scheme.

6. The method of claim 1, wherein the determining the extension base region using the extension information is performed based on bandwidth extension flag information indicating whether the high frequency region signal of the downmix signal is reconstructed using the extension information.

7. An apparatus for processing a signal, the apparatus comprising:
a signal receiving unit receiving a downmix signal including at least one of a first downmix signal decoded by an audio coding scheme and a second downmix signal decoded by a speech coding scheme;
an extension base region determining unit determining an extension base signal in the downmix signal based on the extension information;
a high frequency region signal reconstructing unit extending the extension base signal in a time domain, and generating a high frequency region of the downmix signal by decrementing a number of samples of the extended extension base signal; and
a band extending unit generating an extended downmix signal using the high frequency region of the downmix signal and the downmix signal,
wherein the extension information comprises at least one of a range of a filter applied to the downmix signal, a start frequency of the extension base signal and an end frequency of the extension base signal.

8. The apparatus of claim 7, wherein the extension base region determining unit determines a signal of a partial frequency region in the downmix signal as the extension base signal.

9. The apparatus of claim 7, wherein the high frequency region reconstructing unit reconstructs the high frequency region signal included not in the downmix signal but in an original signal inputted to the encoder.

10. The apparatus of claim 7, wherein the high frequency region reconstructing unit reconstructs the high frequency region signal having a bandwidth not identical to that of the extension based signal.

11. The apparatus of claim 7, wherein the audio coding scheme comprises a coding scheme in a frequency domain using time-frequency transform and wherein the speech coding scheme comprises a coding scheme using a linear prediction coding scheme.

* * * * *